US006954466B1

(12) United States Patent
Dalleggio et al.

(10) Patent No.: US 6,954,466 B1
(45) Date of Patent: Oct. 11, 2005

(54) LINK-LAYER RECEIVER

(75) Inventors: Anthony Dalleggio, Holmdel, NJ (US); Denis Rystsov, Long Island City, NY (US)

(73) Assignee: Modelware, Inc., Red Bank, NJ (US)

( * ) Notice: Subject to any disclaimer, the term of this patent is extended or adjusted under 35 U.S.C. 154(b) by 100 days.

(21) Appl. No.: 10/457,175

(22) Filed: Jun. 9, 2003

Related U.S. Application Data

(63) Continuation of application No. 10/378,535, filed on Mar. 3, 2003, now abandoned.

(60) Provisional application No. 60/361,810, filed on Mar. 5, 2002.

(51) Int. Cl.[7] ............................................. H04L 12/66
(52) U.S. Cl. ..................... 370/463; 370/469; 710/56
(58) Field of Search ............................... 370/469, 463, 370/465–466, 419, 401; 710/52, 56

(56) References Cited

U.S. PATENT DOCUMENTS

| | | | | |
|---|---|---|---|---|
| 6,642,865 | B2 * | 11/2003 | Calvignac et al. | 341/102 |
| 6,668,297 | B1 * | 12/2003 | Karr et al. | 710/305 |
| 2003/0182613 | A1 * | 9/2003 | Chu | 714/758 |
| 2003/0193962 | A1 * | 10/2003 | Primrose et al. | 370/411 |
| 2003/0196132 | A1 * | 10/2003 | Chiang | 713/503 |

OTHER PUBLICATIONS

DiGiuseppe et al., "Virtex-II Platform FPGAs Support System Packet Interface Standards for Optical Network," Jul. 1, 2001, http://www.xilinx.com/publications/products/v2/v2optical.htm.*

System Packet Interface Level 4 (SPI-4) Phase 2: OC-192 System Interface for Physical Link Layer Device, Optical Internetworking Forum, Jan. 2001.

* cited by examiner

Primary Examiner—Ricky Ngo
Assistant Examiner—Nittaya Juntima
(74) Attorney, Agent, or Firm—Lerner, David, Littenberg, Krumholz & Mentlik, LLP

(57) ABSTRACT

A System Packet Interface (SPI) level 4 receiver groups four consecutive 16 bit control/data words into a single 64 bit word (with a resultant rate of up to 210 MHz). The 64 bit word is processed for storage in a dual memory structure comprising two first-in-first-out (FIFO) memories for storing 64 bit words, wherein the 64 bit word may be stored in one, or both, of the FIFOs. The SPI-4.2 receiver issues commands that control subsequent processing of the 64 bit words (e.g., for alignment) using three types of commands, which are based on the relative temporal position of control words in the received data. Temporally, these commands are characterized as: PRE-COMMANDS, POST-COMMANDS and PRESENT-COMMANDS. A parallel general and selection method (PGSM) is used for FIFO Write Command Generation and for Diagonally Interleaved Parity (DIP-4) checking.

30 Claims, 9 Drawing Sheets

FIG. 9

| CONTROL BIT COMBINATIONS | SWITCH COMMAND |
| --- | --- |
| 0000 | 0 ALWAYS |
| 0001 | 1 IF WORD 0 IS A PAYLOAD CONTROL WORD, 0 OTHERWISE |
| 0010 | 1 IF WORD 1 IS A PAYLOAD CONTROL WORD, 0 OTHERWISE |
| 0011 | 1 IF WORD 0 IS A PAYLOAD CONTROL WORD, 0 OTHERWISE |
| 0100 | 1 IF WORD 2 IS A PAYLOAD CONTROL WORD, 0 OTHERWISE |
| 0101 | 0 IF BOTH WORD 2 AND WORD 0 ARE PAYLOAD CONTROL WORDS, OR IF BOTH WORD 2 AND WORD 0 ARE IDLE CONTROL WORDS, 1 OTHERWISE |
| 0110 | 1 IF WORD 1 IS A PAYLOAD CONTROL WORD, 0 OTHERWISE |
| 0111 | 1 IF WORD 0 IS A PAYLOAD CONTROL WORD, 0 OTHERWISE |
| 1000 | 1 IF WORD 3 IS A PAYLOAD CONTROL WORD, 0 OTHERWISE |
| 1001 | 0 IF BOTH WORD 3 AND WORD 0 ARE PAYLOAD CONTROL WORDS, OR IF BOTH WORD 3 AND WORD 0 ARE IDLE CONTROL WORDS, 1 OTHERWISE |
| 1010 | 0 IF BOTH WORD 3 AND WORD 1 ARE PAYLOAD CONTROL WORDS, OR IF BOTH WORD 3 AND WORD 1 ARE IDLE CONTROL WORDS, 1 OTHERWISE |
| 1011 | 0 IF BOTH WORD 3 AND WORD 0 ARE PAYLOAD CONTROL WORDS, OR IF BOTH WORD 3 AND WORD 0 ARE IDLE CONTROL WORDS, 1 OTHERWISE |
| 1100 | 1 IF WORD 2 IS A PAYLOAD CONTROL WORD, 0 OTHERWISE |
| 1101 | 0 IF BOTH WORD 2 AND WORD 0 ARE PAYLOAD CONTROL WORDS, OR IF BOTH WORD 2 AND WORD 0 ARE IDLE CONTROL WORDS, 1 OTHERWISE |
| 1011 | 1 IF WORD 1 IS A PAYLOAD CONTROL WORD, 0 OTHERWISE |
| 1111 | 1 IF WORD 0 IS A PAYLOAD CONTROL WORD, 0 OTHERWISE |

LINK-LAYER RECEIVER

CROSS-REFERENCE TO RELATED APPLICATIONS

This application is a Continuation of patent application Ser. No. 10/378,535, filed Mar. 3, 2003, now abandoned and claims the benefit of U.S. Provisional Patent Application 60/361,810 filed Mar. 5, 2002, which is hereby incorporated by reference herein.

BACKGROUND OF THE INVENTION

This invention relates generally to communications and, more particularly, to packet communications systems.

The Optical Internetworking Forum's (OIF) System Packet Interface Level 4 Phase 2 (SPI-4.2) defines an interface for the interconnection of Physical Layer devices to Link Layer devices for packet and cell transfer over OC-192 ATM (Asynchronous Transfer Mode) and Packet over SONET/SDH (POS), 10 Gb/s (Giga bit per second) Ethernet, as well as general purpose 10 Gb/s communication links. (For additional information see "System Packet Interface Level 4 (SPI-4) Phase 2: OC-192 System Interface for Physical and Link Layer Device," Optical Internetworking Forum, January 2001.)

The receive module for the Link Layer (hereinafter simply referred to as the SPI-4.2 receiver, or receiver) monitors the SPI-4.2 interface data bus, and is responsible for processing and storing received data.

As a result of the 10 Gb/s aggregate data bandwidth of the SPI-4.2 interface, the receiver must perform high-speed data processing—i.e., processing and storing 16 bit data words at rates typically up to 800 MHz (400 MHz, Double Data Rate (DDR)). For example, the SPI-4.2 interface requires state-based processing at these high data rates, where the states of the receiver and the state transitions are based on received control/data words. In addition, this state-based processing by the receiver involves monitoring received data for packet flow indications, changing the state according to these indications, and storing the received data according to the previous and current states. The SPI-4.2 standard also defines "shared" control words, which simultaneously end the previous transfer and start a new transfer.

In addition to the above-mentioned state-based processing, alignment issues must be considered in the context of this high-speed environment. In particular, there must be alignment of the Channel Address (ADDR), Start-of-Packet (SOP), End-of-Packet (EOP), Modulo (MOD) and Error (ERR) indications with respect to the corresponding data word. In particular, the received data presented to the Link Layer must have the ADDR and SOP indications aligned with the first word of the packet, while the EOP, MOD and ERR indications must be aligned with the last word of the packet. However, the ADDR and SOP indications on the SPI-4.2 interface precede the first data word, while the EOP, MOD and ERR indications follow the last data word.

SUMMARY OF THE INVENTION

We have observed that the high-speed processing requirements for implementing an SPI-4.2 receiver do not lend themselves to a straight-forward design approach, since it is likely that any resultant receiver will process SPI-4.2 data using long combinational paths—through multiple levels of logic implementation—and, as such, may not meet the frequency requirements of the SPI-4.2 interface.

Therefore and in accordance with an aspect of the invention, a packet receiver incorporates a Parallel Generation and Selection Method (PGSM) for performing precalculations on all permutations of control/data words over a time period.

In accordance with another aspect of the invention, a receiver groups every k bits of received data into L bits of data, where L>k and k>1, wherein some of the received data may represent control and/or data words, and the receiver processes the L bits of data using the possible spatial combinations of data and/or control words.

In an embodiment of the invention, the packet receiver includes a converter and a controller. The converter receives a group of data bits in a time period T and provides N groups of data bits every NT time periods and receives j control bits in the time period T and provides Nj control bits every NT time periods. Each group of data bits represents either a payload (also referred to herein as payload data) or control (also referred to herein as control data). The controller processes the N groups of data bits in accordance with every possible combination of payload data and control data for the N groups of data bits to determine $2^N$ possible output signals and selects as an output signal one of the $2^N$ possible output signals, where the selection is performed as a function of a value of the Nj control bits.

In another embodiment of the invention, an SPI-4.2 receiver groups four consecutive 16 bit control/data words into a single 64 bit word (with a resultant frequency of up to 200 MHz). A parallel general and selection method (PGSM) is used for FIFO Write Command Generation and for Diagonally Interleaved Parity (DIP-4) checking. In particular, rather than conditionally decoding four 16 bit words based on the control/data word indications, PGSM generates the necessary actions for all possible control/data word combinations within the 64 bit word. In this context, each of the generator sub-modules decodes the four 16 bit words, based on a given control/data alignment. This computation, or precalculation, is executed over a single clock cycle. On the following clock cycle the output of the sub-module with the control/data alignment that matches the actual combination of received control/data words is selected using a simple multiplexer. Illustratively, the 64 bit word is processed in accordance with each of the possible 16 combinations of control/data words for storage in a dual memory structure comprising two first-in-first-out (FIFO) memories, wherein the 64 bit word may be stored in alternating fashion in one FIFO, or parts of the word stored in both of FIFOs.

In accordance with another aspect of the invention, a receiver groups every k bits of received data into L bits of data, where L>k and k>1, and issues commands to control subsequent processing of the received data as a function of a temporal position of command words in the received data.

In an embodiment of the invention, an SPI-4.2 receiver groups four consecutive 16 bit control/data words into a single 64 bit word (with a resultant frequency of up to 200 MHz). The SPI-4.2 receiver issues commands that control subsequent processing of the 64 bit words (e.g., for alignment) using three types of commands, which are based on the relative temporal position of control words in the received data. Temporally, these commands are characterized as: PRE-COMMANDS, POST-COMMANDS and PRESENT-COMMANDS.

PRE-COMMANDS apply to those data words that are received during the clock cycle following the reception of a command word. PRE-COMMANDS are used when the SOP indication is received as part of the 64 bit word, preceding the 64 bit word containing the first data words of the new packet. When issued, PRE-COMMANDS activate WRITE, ADDR and SOP indications during the following clock cycle, thus aligning those indications with the corresponding data word.

POST-COMMANDS apply to those data words that are received during the previous clock cycle of a current received command. POST-COMMANDS are used when the EOP, MOD and ERR indications are received as part of the 64 bit word, following the 64 bit word containing the last Data Word of the completed packet.

PRESENT-COMMANDS apply to those data received during the same clock cycle with the command word. These commands are primarily issued to write valid Data Words, but may also activate WRITE, ADDR, SOP, EOP, MOD and ERR indications when these indications are received as part of the 64 bit word that also contains the data for the current data burst.

BRIEF DESCRIPTION OF THE DRAWINGS

FIG. 9 shows an illustrative state table for a set of control bit combinations for use in the command generator of FIG. 6.

DETAILED DESCRIPTION

Other than the inventive concept, the elements shown in the figures are known in the art and not described further herein. Further, familiarity with the above-mentioned SPI-4.2 interface is assumed. In addition, those in the art should realize that the inventive concept is realizable either through hardware and/or software (e.g., stored-program control elements (e.g., a digital signal processor with memory), a state machine) and is not limited to the particular structure shown in the figures.

Figure 1:
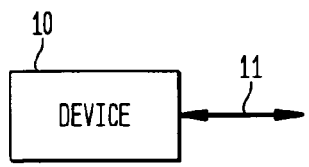
FIG. 1 illustrates a receiver in accordance with the principles of the invention.

FIG. 1 shows a high-level block diagram of a communications device embodying the principles of the invention. In particular, device 10 operates on a data stream, e.g. packets, received via path 11. In this illustrative embodiment, path 11 represents packet and cell transfer over OC-192 ATM (Asynchronous Transfer Mode) and Packet over SONET/SDH (POS) (SONET—Synchronous Optical Network; SDH—Synchronous Digital Hierarchy), or any other 10 Gb/s data stream. Although path 11 is shown as a bi-directional path, it may be unidirectional. Further, only one path was shown for simplicity, i.e., device 10 may have other paths, i.e., connections, to other networks and/or devices in accordance with the principles of the invention. For example, this may also be representative of a point-to-point high-speed bus (e.g., 10 Gb/s) for providing transport between circuit cards (boards) of a system.

Figure 2:
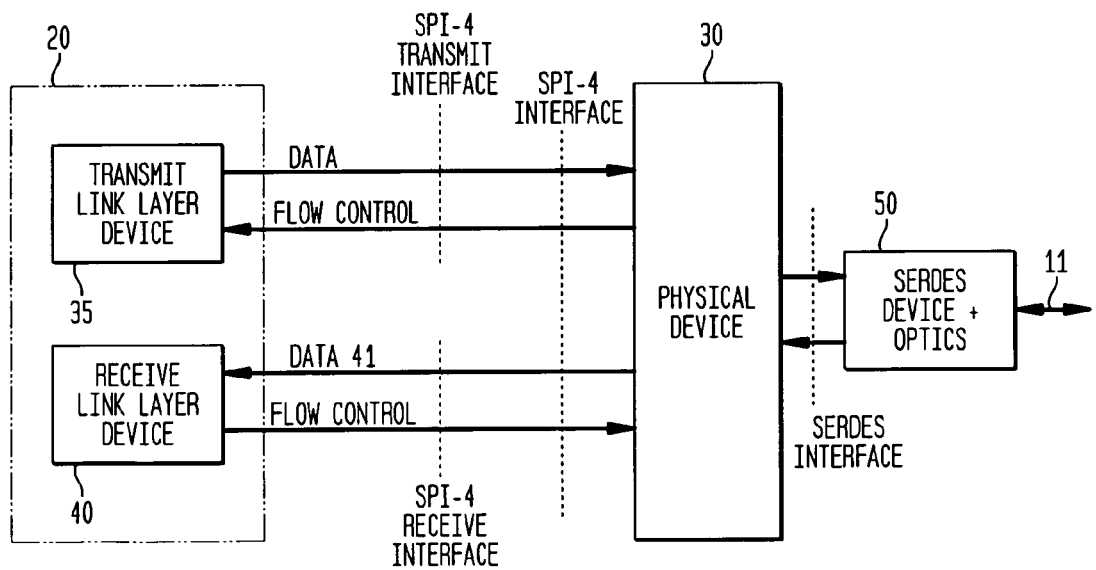
FIG. 2 shows another block diagram of the receiver in accordance with the principles of the invention.

An alternative form of device 10 is shown in FIG. 2, which represents a system reference model showing both transmit and receive elements for device 10 in the context of the well-known link layer and physical layer. Device 10 comprises link layer 20, physical layer 30 and SERializer/DESerializer (SERDES) 50 for the communication of data to, and from, path 11. As known in the art, SERDES 50 encodes and decodes serial optical signals to, and from, path 11. As noted above, the SPI-4.2 interface defines the system packet interface for data transfer between link layer 20 and physical layer 30 in support of packet and cell transfer over OC-192 ATM (Asynchronous Transfer Mode) and Packet over SONET/SDH (POS), as well as 10 Gb/s (Giga bit per second) Ethernet. Link layer 20 further comprises transmit link layer device 35 and receive link layer device 40. In the context of this invention, only receive link layer device 40 (also referred to herein as the "SPI-4.2 receiver," "link layer receiver" or simply the "receiver") is described further herein. Receiver 40 monitors and processes the received data 41 from the SPI-4.2 interface.

Received data 41 represents 16 bit data transfer (16 data bits, 1 control bit, 1 clock) at or above 311 MHz Double Data Rate (DDR), or 622 Mb/s. A typical operating frequency may be at 350 or 400 MHz. The control bit ($17^{th}$ bit) specifies whether the word is a data word or a control word. A data word represents actual data. Control words have control information if "active" and no control information if "idle." The 16 bits of control words represent: 4 bits parity, 8 bits address, 1 bit payload/idle (where, payload=data follows control word, while Idle=no data follows control word), 2 bits packet end (error, 1 of 2 bytes good, both bytes valid), 1 bit SOP, SOB (start of packet, start of burst). There is also flow control (not described herein) for controlling the flow of information being received from a peer device.

Figure 3:
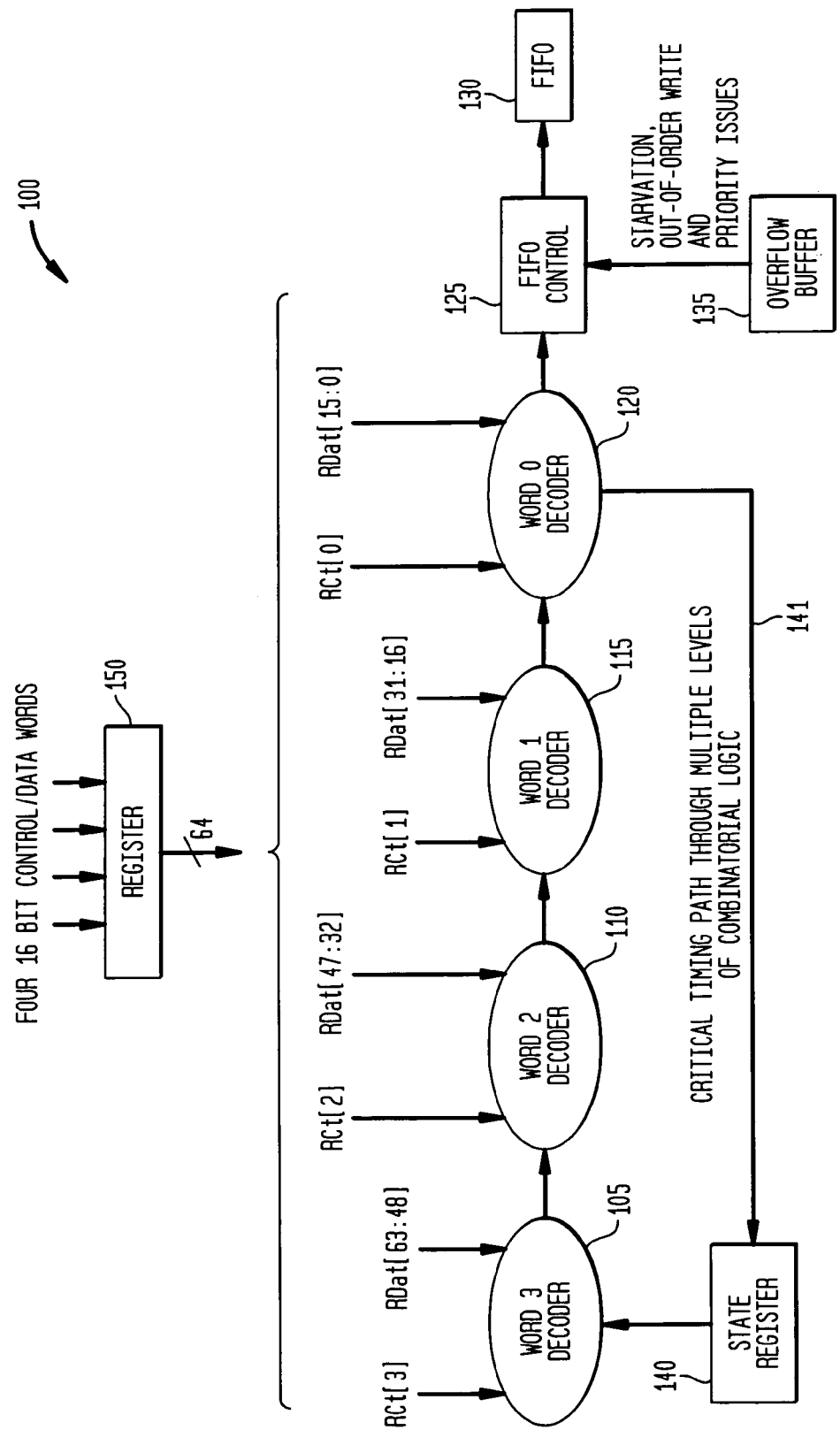
FIG. 3 shows a block diagram of a receiver in accordance with the principles of the invention.

As noted above, and defined in the SPI-4.2 interface, data 41 represents a stream of control/data words, each control/data word comprising 16 bits, at rates typically up to 800 MHz, one control bit and a clock. A straightforward implementation of receiver 40 for processing data 41 is shown in FIG. 3.

As a result of the 10 Gb/s aggregate data bandwidth of the SPI-4.2 interface, the receiver must perform high-speed data processing—i.e., processing and storing 16 bit data words at rates typically up to 800 MHz. One way to ameliorate this processing requirement is to collect the incoming data over a larger time interval. In FIG. 3, four consecutive 16 bit control/data words of data 41 are grouped into a single 64 bit word (with a resultant frequency of typically up to 200 MHz) by register 150. Straightforward implementation of receiver 40 contains four word processing modules organized in sequential fashion as represented by word 0 decoder 120, word 1 decoder 115, word 2 decoder 110 and word 3 decoder 105. The processing for each word decoder for a given control/data word depends on the previous state and the output from all the preceding decoders, as represented by state register 140. Such an implementation results in long combinatorial paths through multiple levels of logic (as represented by path 141) and is unlikely to meet the frequency requirements of the SPI-4.2 interface.

In addition, the SPI-4.2 interface defines "shared" control words, which simultaneously end the previous transfer and start a new transfer. For example, control words A, B, C, D, E and F (in hexadecimal notation) listed in Table 6.3 of the above-mentioned SPI-4.2 interface specification are shared control words. As a result of the grouping of the control/data words, in the presence of two such shared control words interleaved with data words for different channels, the receiver must still be able to process and store two data words within a single clock cycle. For example, receipt of a shared control word, data word, shared control word and data word (1010) indicates that two data words must be stored in a single clock cycle. Therefore the receiver must, e.g., be able to write to one memory location (in FIG. 3, FIFO 130) and store the other word in overflow buffer 135. (The nomenclature xxxx represents the characteristic of the current 64 bit word. For example, 0001 represents reception of three 16 data words and one 16 bit control word.)

As a result, FIFO control module 125 must prevent out-of-order writes (data sequence integrity) and implement priority resolution (stored data vs. new data) when servicing both the incoming data and the data stored in overflow buffer 135 for providing data to FIFO 130.

As noted above, in order to reduce the operating frequency of the receiver, four consecutive 16 bit control/data words, of data 41, are grouped by the receiver as a single 64 bit word, with a resulting frequency of typically up to 200 MHz. While this reduces the operating frequency, it nevertheless presents a challenge in designing a circuit to process any combination of control/data words over a single cycle (here of the 200 MHz). In particular, the grouping of the four 16 bit control/data words requires state-based processing of up to four control/data Words within a single clock cycle, where the states of the receiver and the state transitions (of which there may be up to three) are based on the received control/data word. In addition, this state-based processing by the receiver involves monitoring received data for packet flow indications, changing the state according to these indications, and storing the received data according to the previous and current states. Since any of the four 16 bit control/data words grouped together may contain packet flow indications, each control/data word must be examined in order to determine the resulting state. Furthermore, the processing of data words is affected by the current state and preceding control words. For example, as noted above, the SPI-4.2 standard defines "shared" control words, which simultaneously end the previous transfer and start a new transfer. The grouping of four control/data words may result in the presence of two such shared control words interleaved with data words for different channels—as such, the receiver must still be able to process and store two data words within a single clock cycle.

In addition to the above-mentioned state-based processing, alignment issues must be considered in the context of this high-speed environment when grouping control/data words. In particular, there must be alignment of the Channel Address (ADDR), Start-of-Packet (SOP), End-of-Packet (EOP), Modulo (MOD) and Error (ERR) indications with respect to the corresponding data word. In particular, the received data presented at the output of the Link Layer must have the ADDR and SOP indications aligned with the first word of the packet, while the EOP, MOD and ERR indications must be aligned with the last word of the packet. However, the ADDR and SOP indications on the SPI-4.2 interface precede the first data word, while the EOP, MOD and ERR indications follow the last data word. The ERR indication is representative of the detection of an "abort" condition in a received control word. The MOD indication on the SPI-4.2 interface is a single bit that indicates whether or not the second byte of the 16-bit word is valid at the end of packet. This indication is translated into a 3-bit MOD value in the Link Layer that represents the number of valid data bytes in the last 64-bit word of a packet. Further, as a result of the SPI-4.2 control/data word grouping, the indications and their corresponding data words may be received as parts of two 64 bit words during separate clock cycles. As such, the receiver must be able to update the already stored data word with EOP, MOD and/or ERR indications. The receiver must also be able to modify the received data word with previously received ADDR and SOP indications.

Figure 4:
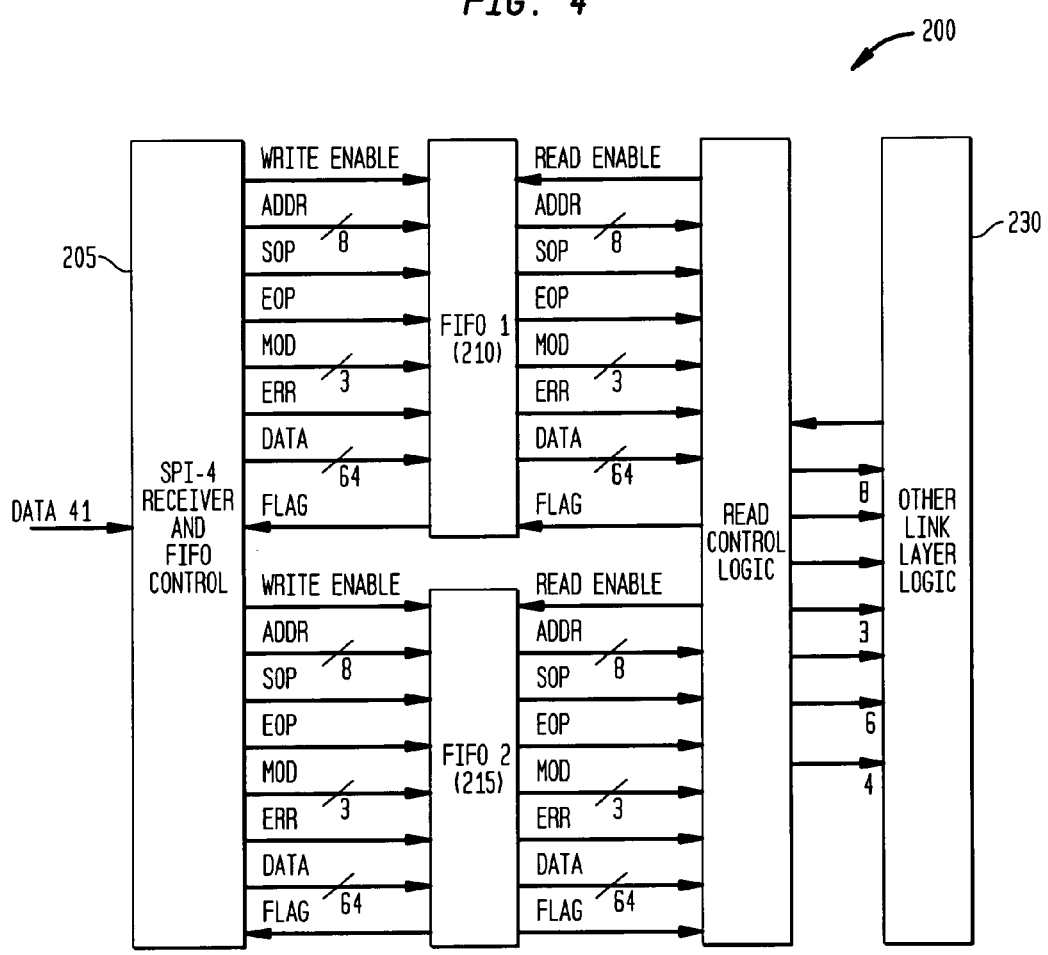
FIG. 4 shows a block diagram of a receiver, in accordance with the principles of the invention, using dual-FIFO storage.

Turning now to FIG. 4, a receiver, 200, in accordance with the principles of the invention is shown. Receiver 200 comprises SPI-4.2 receiver and FIFO control element 205, a dual FIFO structure, as represented by FIFO 210 (also referred to as FIFO 1) and FIFO 215 (also referred to as FIFO 2), read control logic 220, and other link layer logic 230. The read control logic 220 simply alternates the read operation between FIFO 1 and FIFO 2. Other link layer logic 230 represents additional layers (e.g., transport, network layers, etc.) in device 10 for processing of the received data stream provided by the link layer and is not further described herein. The respective FIFO FLAG signals represent status information for the FIFO, e.g., full, empty, etc.

As noted above, the 64 bit words may contain data for two separate channels. This data needs to be stored at two separate locations in a memory buffer (or FIFO) requiring two clocks for each word containing data for two different channels. To accomplish this, a dual FIFO structure is used to provide for spatial expansion of memory. Normally, data is written in an alternating fashion between the two FIFOs. However, when a 64-bit word is received with data for two channels, both FIFOs are written simultaneously.

In this illustrative embodiment, each FIFO is of equal size and has an illustrative width of 79 bits. This approach solves the problem of simultaneous writes of two words to two FIFO memory locations over a single cycle without requiring use of an overflow buffer as illustrated in FIG. 3. At any point during the operation one FIFO is designated as the Active FIFO, while the other is designated as the Idle FIFO (described further below). While receiver 40 is executing only a single write over a clock cycle, only the Active FIFO is written. If it is necessary to execute two FIFO writes over a single clock cycle, both the Active and the Idle FIFOs are written. The Active and Idle FIFO designations are swapped for every new burst of data, so that the data is interleaved in the FIFOs in a per-burst rather than per-word fashion.

Figure 5:
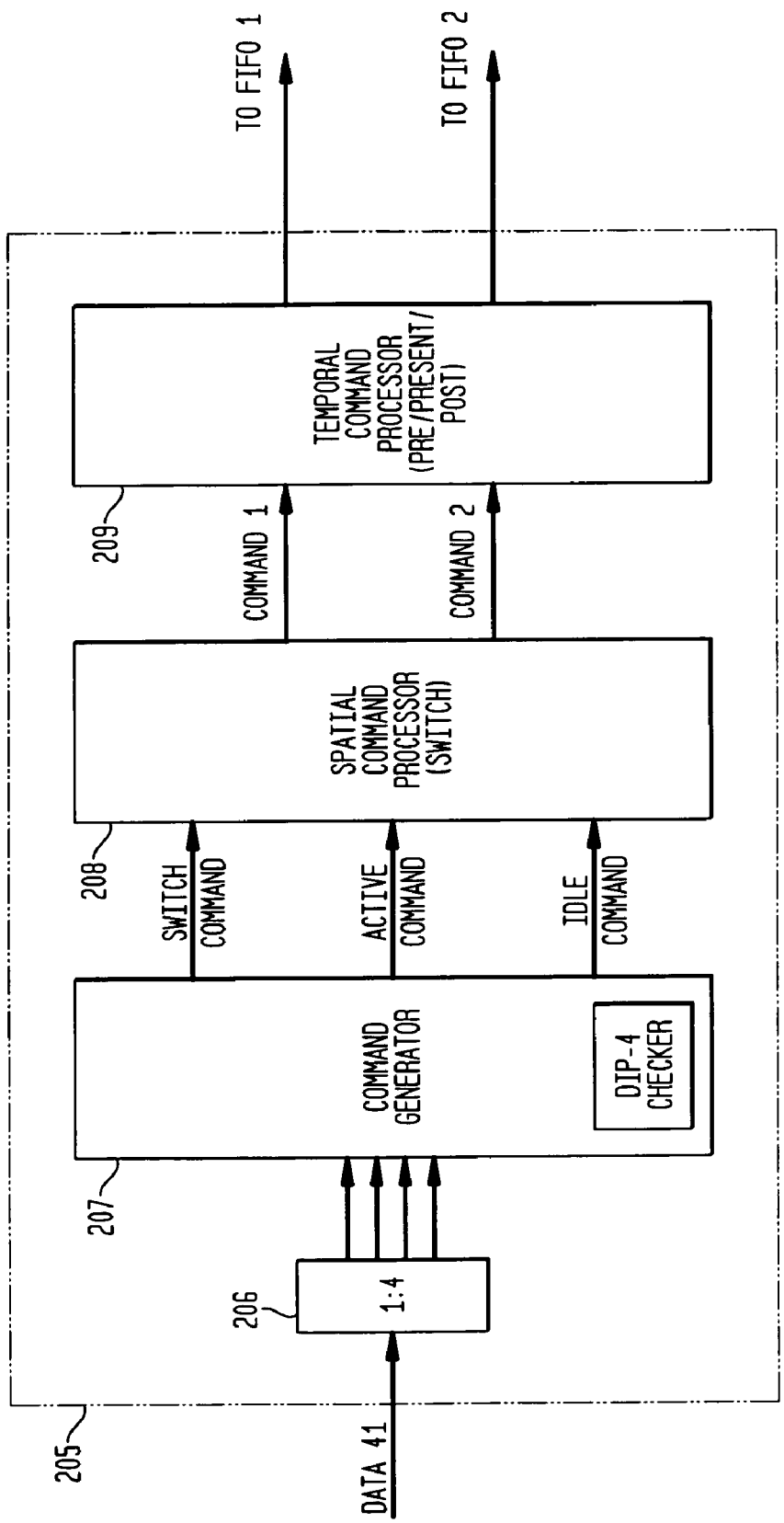
FIG. 5 shows a block diagram of a receiver, in accordance with the principles of the invention, using a command generator, a spatial command processor, and a temporal command processor.

Turning now to FIG. 5, further details of SPI-4.2 receiver and FIFO control element 205 are shown. In particular, the receiver 205 comprises a 1:4 data width converter 206, a command generator 207, a spatial command processor 208, and a temporal switch command processor 209. The data width converter converts the 16-bit data and control bit to wider words, e.g., 64-bit data and 4 control bits (each of the control bits associated with each 16 bit word). The command generator 207 acts on the incoming data and control bits and generates FIFO switch commands and also issues commands to the active FIFO and the idle FIFO, regardless of which physical FIFO is active or idle. The spatial command processor 208 executes the switch command and routes the active/idle commands to the proper physical FIFO. Temporal command processor 209 formats the write data to FIFO 1 and FIFO 2 according to command 1 and command 2 that are received from the spatial command processor, i.e., temporal command processor 209 generates the control signaling for FIFO 1 and FIFO 2.

In the handling of 64 bit data, alignment of the data in the FIFOs must be ensured. Commands in control words decide where data words go, i.e., data words must be aligned in the FIFOs such that the data byte with start of packet (SOP) is stored in the most significant position of a 64 bit FIFO word. The SOP and ADDR are extracted from control words and "aligned" with data when stored in the FIFOs. However, prior and subsequent 64 bit words must be looked at to determine where the current data goes. A three-stage control bit (SOP, EOP, Mod, Err) pipeline is directly populated with pre-commands, commands, or post-commands depending on the control word arrival as described below.

Receiver 40 issues commands that control subsequent blocks which partition and align the data further down the data pipeline. There are a number of types of commands based on the relative temporal position of the data word, these are: SWITCH-COMMANDS, PRE-COMMANDS, POST-COMMANDS, and PRESENT-COMMANDS.

SWITCH-COMMANDS route the active/idle commands to the proper physical FIFO, i.e., the selection of FIFO 1 or FIFO 2. Bursts of data are written alternately to FIFO 1 or FIFO 2. When the 64-bit data word contains data for two separate channels, part of the 64-bit word is written to FIFO 1 and another part to FIFO 2.

PRE-COMMANDS apply to the Data Words that will be received by the command processor during the clock cycle following the reception of the command. Thus, a command is a PRE-COMMAND when the Start-of-Packet indication is received as part of the 64 bit word, preceding the 64 bit word containing the first Data Words of the new packet. When issued, PRE-COMMANDS activate WRITE, ADDR and SOP indications during the following clock cycle, thus aligning those indications with the corresponding Data Word. For example, an SOP is received in a 64 bit word (e.g., 0001) preceding a 64 bit word containing first data words of a packet (e.g., 0000). As such, WRITE, ADDR and SOP indications are activated in the following clock cycle to align (store) the corresponding data word.

POST-COMMANDS apply to the Data Words that were received by the command processor during the previous clock cycle. Thus, a command is a POST-COMMAND when the EOP, MOD and ERR indications are received as part of the 64 bit word, following the 64 bit word containing the last Data Word of the completed packet. For example, in this case, Data has ended. When EOP, MOD and ERR indications are received as part of a 64 bit word following a 64 bit word comprising the last data words of a packet (0000, 0001).

The remainder of the commands are PRESENT-COMMANDS, which apply to the data received during the same clock cycle with the command. These commands are primarily issued to write valid Data Words, but may also activate WRITE, ADDR, SOP, EOP, MOD and ERR indications when these indications are received as part of the 64 bit word (1001) that also contains the data for the current data burst.

Figure 6:
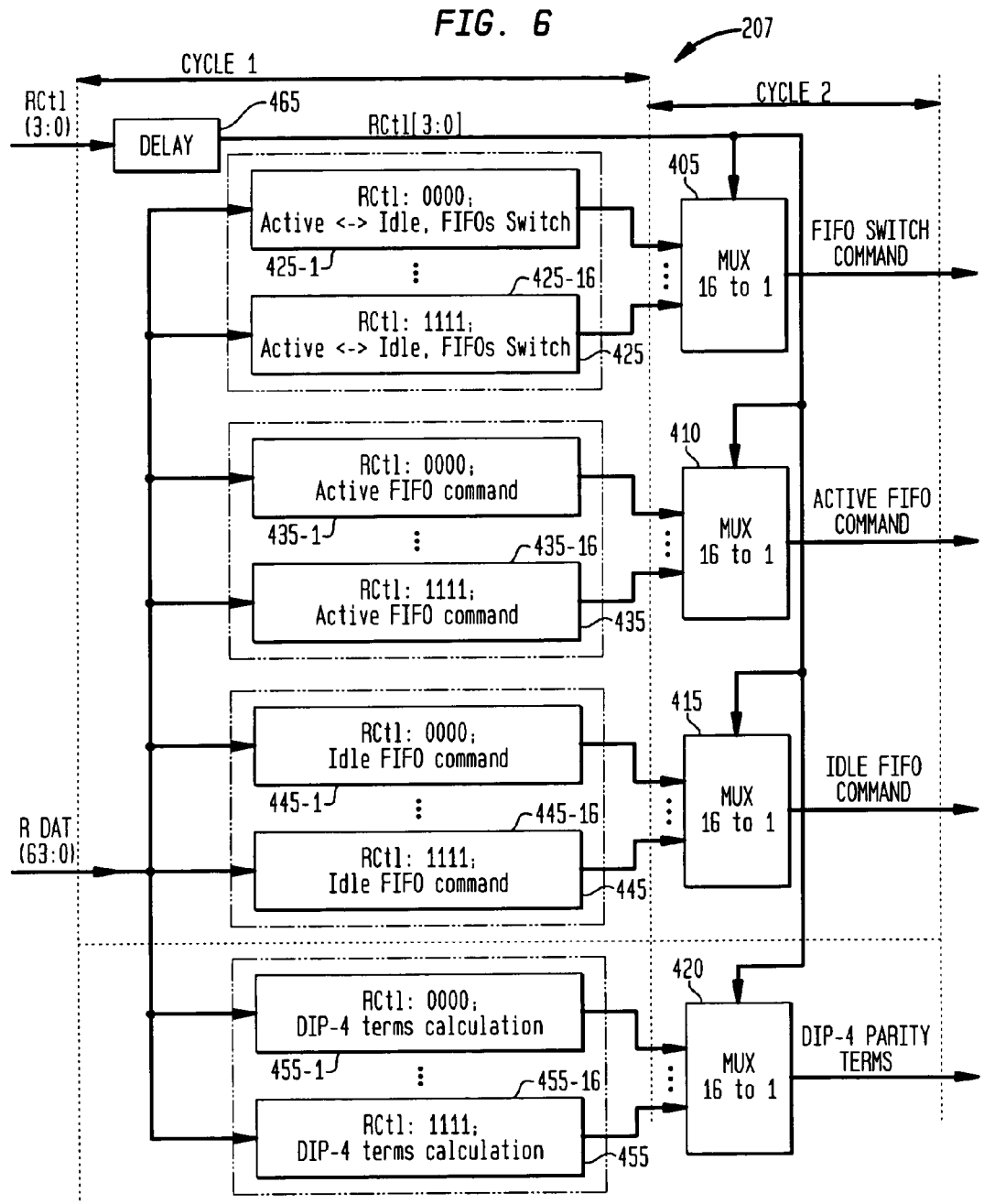
FIG. 6 shows a block diagram of a command generator, in accordance with the principles of the invention, for performing parallel generation and selection.

Turning now to FIG. 6 further details of command generator element 207 are shown. Command generator element 207 comprises a delay element 465, a number of modules (425, 435, 445 and 455) and a number of multixplexers (Mux) (405, 410, 415 and 420). Command generator element 207 illustrates a Parallel Generation and Selection Method (PGSM) for providing FIFO Write Command Generation and for Diagonally Interleaved Parity (DIP-4) checking. PGSM greatly reduces the number of logic levels and increases the maximum operating frequency, simplifies the design implementation, and eases verification.

In particular, rather than conditionally decoding four 16 bit words based on the control/data word indications, PGSM generates, or precalculates, the necessary actions for all possible control/data word combinations within a 64 bit word before determining the actual control/data word combination. Illustratively, each of the modules decodes the four 16 bit words, for every pattern of control/data alignment. This decoding can be implemented in any number of ways. For example, using a stored-program-control processor with associated memory for storing programs and data, a finite state machine, etc. Illustratively, each module of FIG. 6 comprises a number of sub-modules, each sub-module associated with at least one particular control/data word pattern for processing the 64 bits of data Rdat[63:0]. Since each 64 bit data word comprises four control/data words, there are $2^4$, or 16, possible combinations of words being control and/or data. For example, one combination is {control word, control word, data word, data word} (1100), etc. A calculation is performed for each of 16 possibilities of control word positions (0000, 0010, 1010, 1001, etc.). These computations, or precalculations, can be executed over a single clock cycle, e.g., cycle 1 of FIG. 6. On the following clock cycle, e.g., Cycle 2 of FIG. 6, the output signals of each module are provided to the bank of multiplexers (Muxs). Mux 405 and Mux 420 are 1 bit, 16-to-1, multiplexers. Mux 410 and Mux 415 are 101 bit, 16-to-1 multiplexers. Thus, this circuitry decodes all possible combinations of control/data words without yet knowing the actual word order, e.g., whether they are in fact all data words. Since the control/data alignment for each sub-module is fixed, the sub-modules can be made efficient and mutually independent.

Illustratively, the Mux input control signal, RCtl[3:0], is delayed by one clock cycle via delay element 465 before application to Mux 405, 410, 415 and 420. The Mux input control signal, RCtl[3:0], which is four bits wide, controls which one of the 16 sets ($2^4$) of multiplexer input signals are selected by each multiplexer. The Mux input control signal indicates the actual order of words (which is provided by the accumulation of the control bit associated with each of the four control/data words).

For example, Mux 405 controls the generation of the FIFO switch command by selecting one of the output signals from sub-modules 425-1 to 425-16 of module 425. An illustrative state table for each of these sub-modules is shown in FIG. 9. A value of "1" represents switching of the control words. That is, the FIFO that was receiving an Active FIFO command now receives an Idle FIFO command and vice versa. As such, a value of "0" represents no switching of the control words. (The determination of active or idle is the function of the value of the payload/idle bit in a 16 bit word (the 15$^{th}$ bit position). For example, if there are all data words, e.g., (0000), the FIFOs are not switched. Other illustrative combinations are shown in the state table of FIG. 9.

Figure 10:
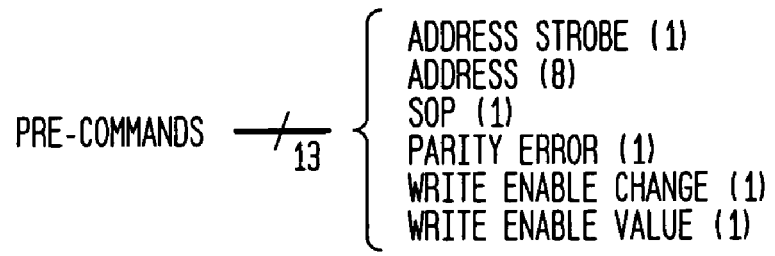
FIGS. 10–12 show illustrative formats for Pre-Commands, Present Commands and Post-Commands.
Figure 11:
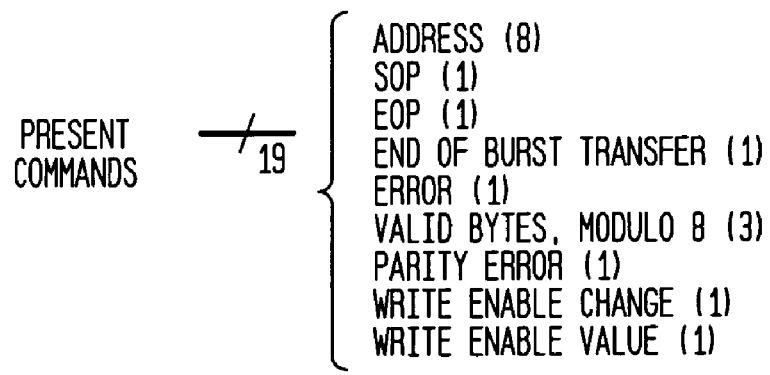
Figure 12:
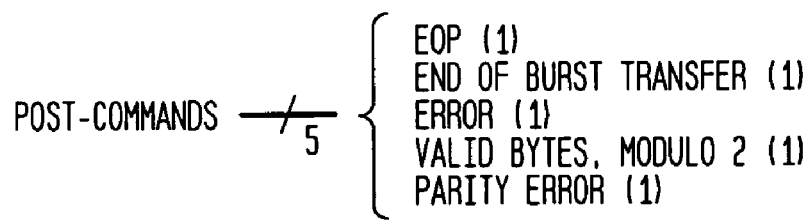

Returning to FIG. 6, Muxs 410 and 415 generate Active and Idle FIFO commands from the corresponding sub-modules 435-1 to 435-16, of module 435, and sub-modules 445-1 to 445-16, of module 445. The format of these commands are illustratively 101 bits of data comprising 64 data bits and 37 bits of additional information. The 37 bits of additional information represent the generated PRE-COMMAND, PRESENT-COMMAND and POST-COMMAND (described above). Illustrative bit assignments for the PRE-COMMAND, PRESENT-COMMAND and POST-COMMAND are shown in FIGS. 10, 11 and 12, respectively. As such, Muxs 410 and 415 also allocate data for storage in the currently selected FIFO. Data is written to the active FIFO until a switch command (described above) occurs. At that point, data is written to the Idle FIFO (now becoming the Active FIFO). As such, bursts of data are written alternately to FIFO 1 or FIFO 2. As noted above, when the 64-bit data word contains data for two separate channels, part of the 64-bit word is written to FIFO 1 and another part to FIFO 2.

Mux 420 generates the DIP-4 parity terms by selection of the output signal from one of the sub-modules 455-1 to 455-16 of module 455. The DIP-4 parity terms are occasionally sent in a control word. Every SPI-4.2 control word has parity (4 bits) for itself and for prior data. A Control word ends the previous parity calculation and starts a new one. Elements 455-1 to 455-16 generate all possible DIP-4 parity terms based on all possible combinations of control/data words. Mux 420 selects the DIP-4 parity terms to use based on the actual control word position (re: RCtl[3:0] values of the accumulated control bit). The DIP-4 parity terms are provided to a processor (not shown) for further processing/checking of the data integrity. (It should be noted that this approach is applicable to other forms of parity checking and generation.)

Figure 7:
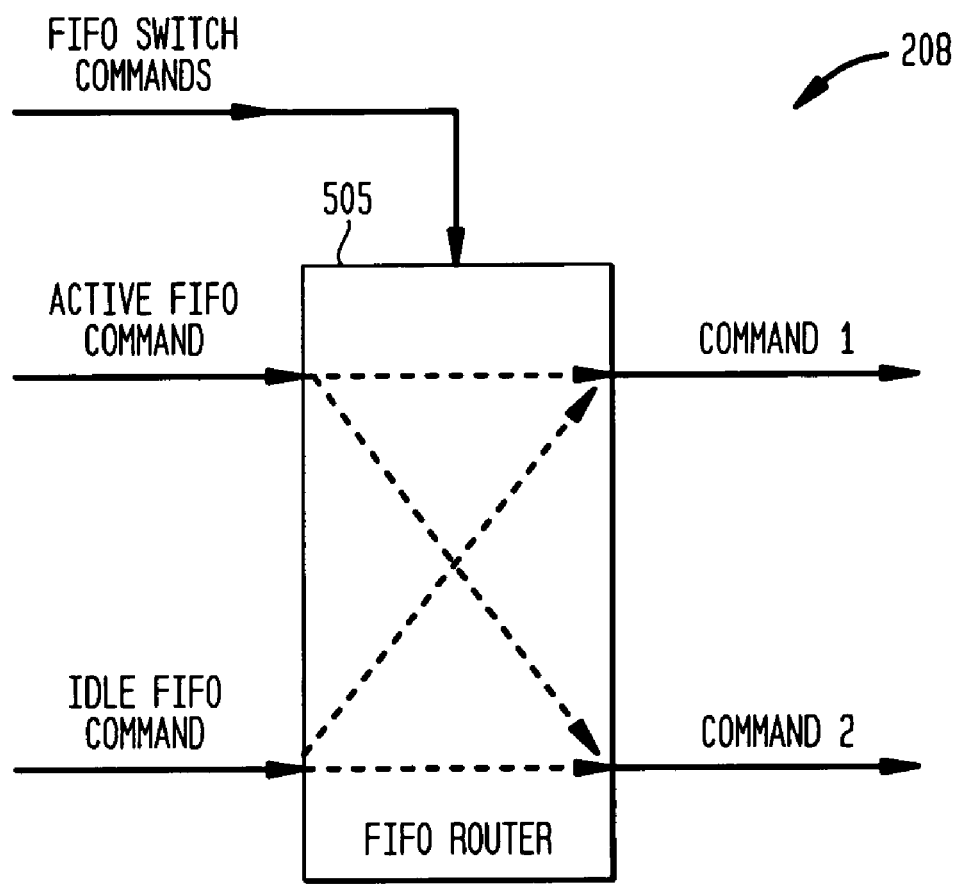
FIG. 7 shows a block diagram of a spatial command processor, in accordance with the principles of the invention, for performing selection of FIFO write commands.

Turning now to FIG. 7, this figure illustrates the details of spatial command processor 208. FIFO router 505 routes the active and idle FIFO commands to physical FIFO 1 or 2. Every time the switch command is received, the FIFO router switches the active/idle designation between FIFO 1 and FIFO 2 and routes the active/idle FIFO command accordingly. The write enable signal, generated for each FIFO by temporal command processor 209, controls which, or if both, FIFOs have data written to them. As noted above, both FIFOs have data written to them when two shared control words are interleaved with data words for different channels. As such, in this instance, the associated Active FIFO command and Inactive FIFO command cause a write enable signal to be generated for both FIFOs in a single clock cycle. Illustratively, (assuming no protocol violations) there are only two control/data word sequences that fit the above description. These are 1010 and 0101, where the first control word indicates an EOPB/SOPB condition, where EOPB represents either the EOP indication being set or the presence of a control word that terminates the data transfer even if the EOP indication is not set, and SOPB indicates a payload control word even if the SOP indication is not set. It should be noted that adjacent transfers need not be directed to different channels, but are still treated as separate transfers according to the above-mentioned SPI-4.2 interface.

Figure 8:
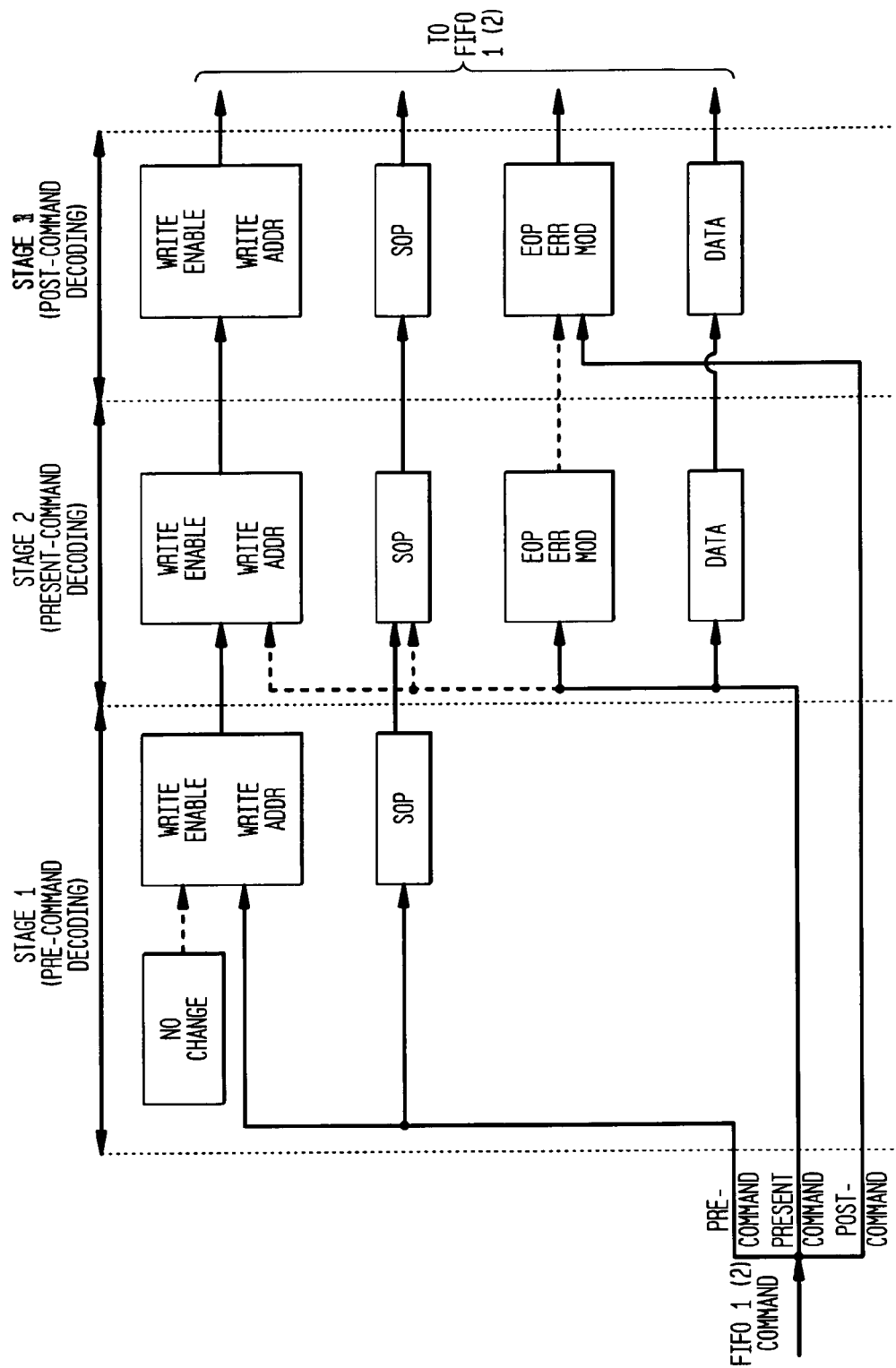
FIG. 8 shows a block diagram of a temporal command processor (PRE-/PRESENT-/POST-), in accordance with the principles of the invention, for performing execution of FIFO write commands.

FIG. 8 details the operation of temporal command processor 209. It should be noted that the elements shown in FIG. 8 show the processing for FIFO 1. There is a duplicate section with respect to FIFO 2 that is not shown for simplicity (indicated by the parenthetical (2) on the figure). Once a PRE-, PRESENT-, or POST-COMMAND is generated to FIFO 1 or FIFO 2, it is handled by the temporal command processor. The temporal command processor consists of a three-stage pipeline containing the write address, data, SOP, EOP, Mod, and Err indications. As the information flows through the pipeline, write address, data, SOP, EOP, Mod, and Err indications are assigned default values or overwritten with new values, depending on the type of command received (PRE-, PRESENT-, or POST-). As such, a PRE-COMMAND controls the setup of the write address and SOP as illustrated. If no PRE-COMMAND is detected, the write address does not change. A POST-COMMAND controls generation of the EOP, ERR and MOD bits as shown. Finally, the PRESENT-COMMANDs control the write address, SOP, EOP, ERR, MOD bits and data as shown. In FIG. 8, the data on the solid lines takes precedence over data on the dashed lines. For example, if the PRE-COMMAND contains an SOP, then the SOP indication is set in the second stage regardless of the SOP in the PRESENT-COMMAND. As noted above, FIGS. 10, 11 and 12 show illustrative formats for the PRE-COMMAND, PRESENT-COMMAND and POST-COMMAND, respectively.

As described above, the inventive concept provides for efficient implementation of the receive module for a Link Layer receiver. In particular, the inventive concept provides for an efficient and robust SPI-4.2 receiver implementation—one that meets the features and the timing requirements of the OIF standard.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. For example, although the invention was illustrated in the context of an SPI-4.2 link layer receiver, the processing techniques are applicable to other forms of receivers, such as, but not limited to, other SPI-type receivers, and are not restricted to the link layer. Further, although illustrated in the context of 64 bit processing, the inventive concept is also applicable to other bit groupings, e.g., 32 bit, 128 bit, etc.

What is claimed is:

1. A packet receiver comprising:
    a converter for receiving a group of data bits in a time period T and providing N groups of data bits every NT time periods and for receiving j control bits in the time period T and providing Nj control bits every NT time periods, wherein each group of data bits represents either payload data or control data and N>1; and
    a controller for processing the N groups of data bits in accordance with possible combinations of payload data and control data for the N groups of data bits and for providing Y possible output signals, where Y>1, and for selecting one of the Y possible output signals as an output signal, where the selection is performed as a function of a value of the Nj control bits.

2. The packet receiver of claim 1, wherein $Y=2^N$.

3. The packet receiver of claim 1, wherein the groups of data bits and the j control bits conform to System Packet Interface Level 4 Phase 2 (SPI-4.2).

4. The packet receiver of claim 1, wherein the controller comprises:
    a delay element for delaying by a clock cycle the Nj control bits;
    a module operative on the N groups of data bits for providing the Y possible output signals; and
    a first multiplexer responsive to the delayed Nj control bits for selecting one of the Y possible output signals as the output signal.

5. The packet receiver of claim 4, wherein the Y possible output signals represent possible parity terms associated with the N groups of data.

6. The packet receiver of claim 5, wherein the parity terms conform to System Packet Interface Level 4 Phase 2 (SPI-4.2).

7. The packet receiver of claim 4, wherein the controller further comprises:
an active command module operative on the N groups of data bits for generating a number of active commands for use in controlling at least two memories;
an inactive command module operative on the N groups of data bits for generating inactive commands for use in controlling the at least two memories;
a second multiplexer for selecting one of the number of active commands; and
a third multiplexer for selecting one of the number of inactive commands.

8. The packet receiver of claim 4, further comprising at least two memories and wherein the output signal further controls a routing of commands for use in writing data to the at least two memories.

9. The packet receiver of claim 8, wherein the at least two memories are First-In-First-Out (FIFO) memories.

10. The packet receiver of claim 8, further comprising:
a spatial command processor responsive to the output signal for routing the commands.

11. The packet receiver of claim 10, further comprising:
a temporal command processor for receiving the routed commands from the spatial command processor and for generating therefrom control signaling for the at least two memories.

12. A packet receiver comprising:
a converter for receiving k bits of data in a time period T and providing Nk bits of data every NT time periods and for receiving j control bits in the time period T and providing Nj control bits every NT time periods;
a controller for processing the Nk bits of data to provide $2^N$ possible output signals and for selecting as an output signal one of the $2^N$ possible output signals as a function of a value of the Nj control bits; and
at least two memories;
wherein the output signal further controls a routing of commands for use in writing data to the at least two memories.

13. The packet receiver of claim 12, wherein the at least two memories are First-In-First-Out (FIFO) memories.

14. The packet receiver of claim 12, wherein the k bits of data and the j control bits conform to System Packet Interface Level 4 Phase 2 (SPI-4.2).

15. The packet receiver of claim 12, wherein the controller comprises:
a delay element for delaying by a clock cycle the Nj control bits;
a module operative on the Nk bits of data for providing the $2^N$ possible output signals; and
a first multiplexer responsive to the delayed Nj control bits for selecting one of the $2^N$ possible output signals.

16. The packet receiver of claim 15, wherein the controller further comprises:
an active command module operative on the Nk bits of data for generating a number of active commands for use in controlling the at least two memories;
an inactive command module operative on the Nk bits of data for generating inactive commands for use in controlling the at least two memories;
a second multiplexer for selecting one of the number of active commands; and
a third multiplexer for selecting one of the number of inactive commands.

17. The packet receiver of claim 15, wherein the controller further comprises:
a parity module operative on the Nk bits of data for generating possible parity terms; and
a second multiplexer for selecting one of the possible parity terms.

18. The packet receiver of claim 17, wherein the parity terms conform to System Packet Interface Level 4 Phase 2 (SPI-4.2).

19. The packet receiver of claim 12, further comprising:
a spatial command processor responsive to the output signal for routing the commands.

20. The packet receiver of claim 19, further comprising:
a temporal command processor for receiving the routed commands from the spatial command processor and for generating therefrom control signaling for the at least two memories.

21. A method for use in a packet receiver, comprising:
accumulating N groups of data in a time period T, where each group of data represent either payload data or control data;
accumulating Nj control bits associated with the N groups of data over the time period T;
processing the accumulated N groups of data using possible combinations of payload data and control data to provide $2^N$ possible output signals; and
selecting an output signal from one of the $2^N$ possible output signals, where the selection is performed as a function of a value of the Nj control bits.

22. The method of claim 21 further comprising:
controlling a routing of commands for use in writing data to at least two memories as a function of the output signal.

23. The method of claim 22, wherein the at least two memories are First-In-First-Out (FIFO) memories.

24. The method of claim 22, wherein the commands are of at least a first type and a second type, further comprising:
operating on the N groups of data bits for generating a number of possible commands according to the first type for use in controlling the at least two memories;
operating on the N groups of data bits for generating a number of possible commands according to the second type for use in controlling the at least two memories;
selecting as an active command one of the number of possible commands according to the first type as a function of a value of the Nj control bits; and
selecting as an inactive command one of the number of possible commands according to the second type as a function of a value of the Nj control bits.

25. The method of claim 24, further comprising:
routing the active command and the inactive command as a function of a value of the output signal.

26. The method of claim 25, further comprising:
generating from the routed active command routed inactive command control signaling for the at least two memories.

27. The method of claim 21, further comprising:
operating on the N groups of data bits for generating possible parity terms; and
selecting a parity term from the possible parity terms as a function of a value of the Nj control bits.

28. The method of claim 27, wherein the parity terms conform to System Packet Interface Level 4 Phase 2 (SPI-4.2).

29. The method of claim 21, wherein each group of data conform to System Packet Interface Level 4 Phase 2 (SPI-4.2).

30. The method of claim 21, further comprising:
delaying by a clock cycle the Nj control bits before use in the selecting step.

* * * * *